March 23, 1965    L. D. MASON    3,174,574
MOTORIZED GOLF CART
Filed June 17, 1963    2 Sheets-Sheet 1

LEO DALE MASON
INVENTOR.

BY *Lucas J. DeKoster*
HIS ATT'Y

March 23, 1965  L. D. MASON  3,174,574
MOTORIZED GOLF CART

Filed June 17, 1963  2 Sheets-Sheet 2

LEO DALE MASON
INVENTOR.

BY Lucas J. Foster
HIS ATT'Y

United States Patent Office 3,174,574
Patented Mar. 23, 1965

3,174,574
MOTORIZED GOLF CART
Leo Dale Mason, Peterson, Iowa
Filed June 17, 1963, Ser. No. 288,296
7 Claims. (Cl. 180—25)

This invention pertains to self mobile carts and more particularly to a cart which may be self mobile for one particular use and be adapted to be trailed behind an automobile at other times.

Self propelled carts for use on golf courses and the like have become increasingly common in past years. These carts are generally powered by small gasoline or electric motors and are adapted to carry one, two or four golfers and their equipment. The carts are generally left at the club where the owner is a member or may be owned by the club and be available on a rental basis to members or other golfers.

There are, however, many golfers who like to play on courses other than their home course, or who may want a cart available at a vacation area or the like. Previous to my invention, it has been quite difficult to transport such carts. Usually the cart has had to be loaded onto a trailer, fastened in place and then hauled to the new location. This has not been satisfactory, because it requires a completely new unit—the trailer—and considerable work.

By my invention I have made possible the use of the cart itself as its own trailer by a simple expedient, and have therefore made possible easy and rapid transportation of the cart from one location to another.

A more complete understanding of my invention in its embodiment may be had from a study of the following specification and the figures in which.

Figure 1:
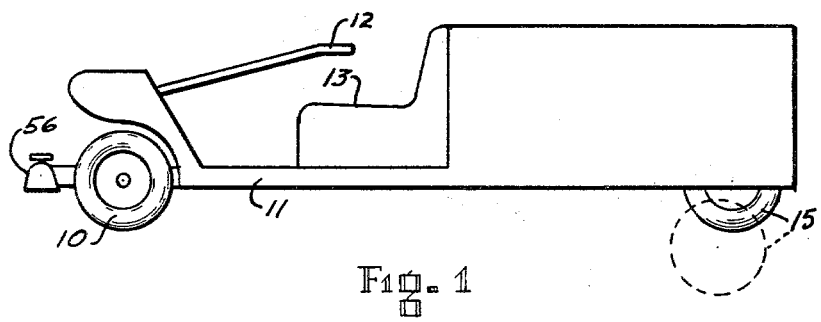
FIG. 1 is a side elevation view of a cart embodying my invention showing the two alternative positions of the rear wheel.
Figure 2:
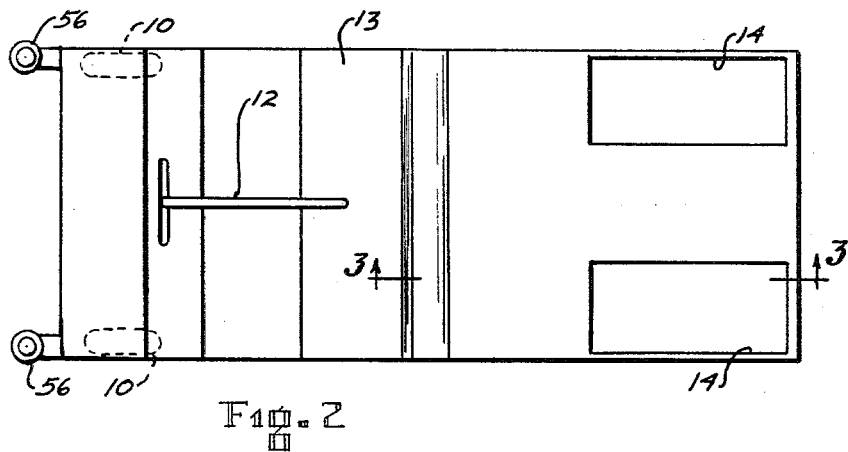
FIG. 2 is a top plan view of the cart.

Briefly my invention comprises a golf cart adapted to be driven by a single rear wheel. The rear wheel is adapted to be disengaged from the drive mechanism and become a full swiveling wheel so that the cart may be towed behind a car as a trailer.

More specifically and referring to the figures throughout which like reference characters refer to like parts, I provide a cart of not unusual formation having two steerable front wheels 10 mounted on a frame 11 and steerable by a tiller 12 in a manner well known in the art. A seat 13 is provided for one or more persons to ride the cart, and an open compartment 14 is provided for the carrying of the bags of clubs customarily carried by golfers.

Figure 3:
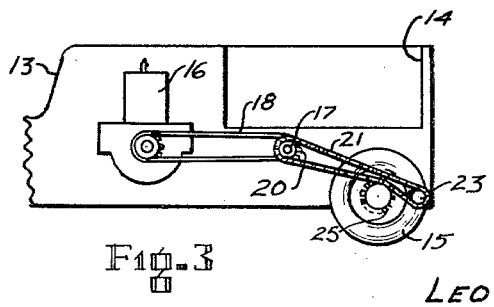
FIG. 3 is a schematic sectional view along line 3—3 of FIG. 2 showing the schematic drive mechanism certain parts being omitted to show other parts more clearly.

As shown in the schematic view, FIG. 3, the cart is driven by a single rear wheel 15. The drive motor 16 may be mounted by any conventional means on the frame work 11. This motor may be either gasoline powered or battery driven electric as will be obvious. The motor drives an idler shaft 17 by means of a belt 18. The idler shaft 17 may be journalled in brackets 19 (FIGS. 4 and 5) and extend completely across the frame. Mounted on the idler shaft and adapted to be driven thereby is a sprocket 20 which in turn drives a chain 21.

The chain 21 is draped somewhat loosely between the drive sprocket 20 and an idler sprocket 23 also mounted on the frame 11. When the wheel 15 is in the upper or driven position as shown in FIG. 3, the chain 21 is engaged in driving relationship with a driven sprocket 25 fixed to the wheel 15. When the wheel is dropped to its lower or trailing position, the sprocket 25 disengages from the chain so that no driving relationship is present, and the wheel is free to rotate without drag other than the friction of the bearings. In order to preserve the proper tension of the chain 21, any of a number of types of spring mountings may be used for the sprocket 23. An alternative type of tension preserver might be a weighted idler pulley or sprocket on the upper run of the chain 21. Since these are common and well known, no such device is shown.

It will now be apparent that by raising or lowering the wheel 15, I can engage or disengage the drive mechanism. Thus, when the wheel is lowered, the cart will run freely and could be trailed behind an automobile.

Figure 4:
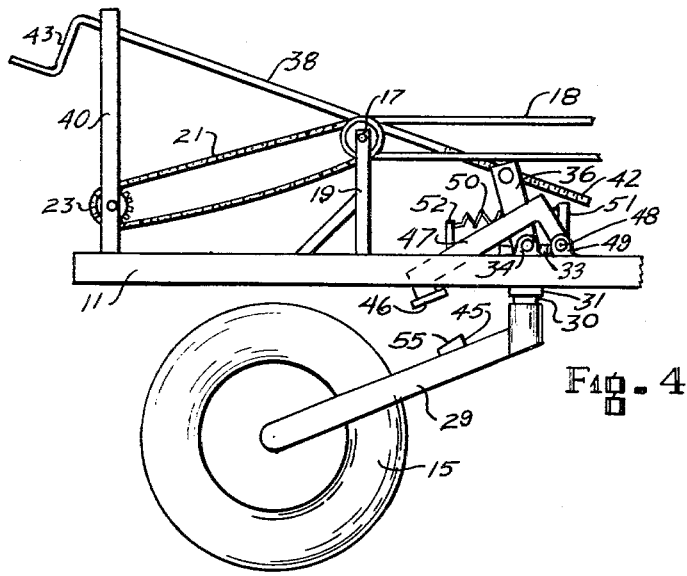
FIG. 4 is a detailed sectional view to an enlarged scale of the rear portion of the cart with the body removed, showing the wheel lowering mechanism.
Figure 5:
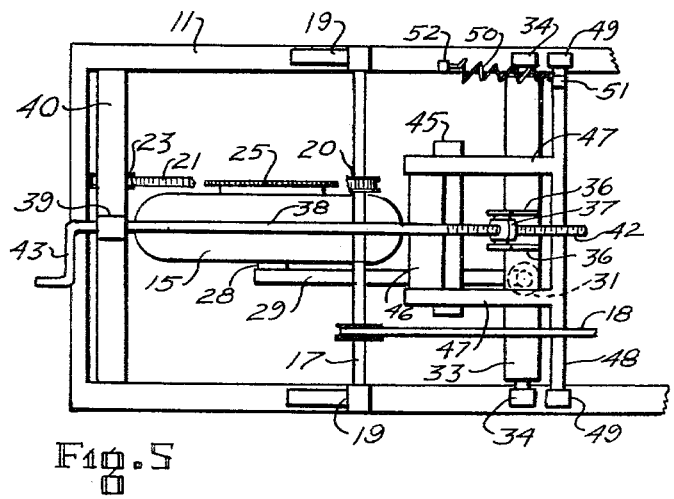
FIG. 5 is a top plan view of the mechanism shown in FIG. 4.

However, in order to be useful, the rear wheel must not only rotate freely, but should also swivel or caster. This is true of all single-wheel trailers such as this cart will be when being trailed. The mechanism used to make possible the castering action is best shown in FIGS. 4 and 5. As there shown, the wheel 15 is journalled on an axle 28 fixed to an arm 29. This arm, at the end opopsite the axle 28, carries a stub axle 30 journalled in a bearing 31. It will be noted that the arm 29 is shown straight in the plan view so that the center of the line of travel of the wheel is offset from the center of the bearing 31. This is not the preferred situation but is done for the sake of ease of illustration. In the preferred device the axle 30 and bearing 31 would be offset on the arm 29, or the arm would be bent so that in either case, the wheel 15 trailed directly behind the center of the castering bearing 31.

The bearing 31 is fixed to a tilting bar 33. This bar is journalled for tilting movement in bearings 34 mounted on the frame 11. Since this bar is free to tilt, it will be apparent that the wheel 15 can be raised or lowered by tilting the bar 33. The exact mode of fixing the bearing 31 to the bar 33 is not vital to my invention. I conceive the possibility that some fastening which will allow a resilience at this point may be used. In the alternative, the arm 29 may be formed of spring metal to provide a resilient mounting of the wheel 15.

The mechanism for tilting the bar 33 is quite simple. A pair of lugs 36 fixed to the bar carry a tiltably mounted nut 37. A long, screw-threaded shaft 38 is threaded into the nut 37 and extends rearwardly of the cart through a bearing 39 mounted in a framework 40 on the frame 11. The bearing 39 allows free rotation of the shaft 38 but restricts movement of the shaft along its axis. Thus, when the shaft is rotated, the nut, by its threaded engagement with the threads 42 on the shaft, will pull the lugs 36 either forward or backward of the cart, causing the bar 33 to tilt. This in turn will raise or lower the wheel 15 between its two positions. A crank 43 is provided on the end of the shaft 38 to facilitate manual control of the position of the wheel.

The last remaining problem to be solved is that of aligning the wheel sprocket 25 with the chain 21 when the wheel is brought to the driven position. This can be accomplished by various means. The one I prefer to use is illustrated in FIGS. 4 and 5. However, it will be apparent that a fork with spread tines adapted to straddle the arm 29 could be used in a manner well known in the art.

My preferred alignment means includes an aligning bar 45 welded or otherwise fixed to the arm 29. Adjacent to the bar 45 and adapted to engage it as the arm 29 rises is a beam 46 carried by two arched carrier arms 47. These arms are carried by a shaft 48 journalled in bearings 49 on the frame. The shaft is biased in a direction such that the beam 46 is urged to a position nearest the bar 45. This bias is impressed by a spring 50 engaged between an arm 51 on the shaft 48 and an ear 52 on the frame 11. In the figures, this spring is a tension spring so that the bias is in the proper direction. It will be apparent that the engagement of the arms 47 with the bar 33 will stop the rotation of the arms. However, if such a stop is considered undesirable, it would be possible to provide other stop means.

In operation, the alignment is achieved by the engagement of the bar 45 with the beam 46. The upper surface 55 of the bar 45 may be slanted to engage the lower surface of the beam 46 in a surface to surface engagement. Thus there are no edges which will mar either surface. If the wheel is properly in line, the surfaces are engaged all along the length of the beam 46. However, because of the fact that the surface 55 of the bar 45 is not perpendicular to the axis of rotation of the axle 30 in the bearing 31, such engagement is not possible unless the wheel is properly aligned. If the wheel is out of alignment, then one end of the bar 45 will engage the beam 46 before the rest of the surface 55. This is true because the bar will be tipped relative to the beam because of the lack of perpendicularity of the rotational axis. Therefore, as the pressure of engagement between the misaligned bar 45 and the beam 46 increases when the wheel is drawn up displacing the beam against the pressure of the spring 50, there will be tendency of the bar 45 to swing into full engagement with the beam 46. In practice, the spring 50 need be of only moderate strength in order to provide sufficient pressure to cause proper alignment. Furthermore, the weight of the cart on the wheel 15 tends to facilitate movement of the crank 43 against the pressure of the spring so that the spring may be fairly strong without hindering easy operation of the crank.

In order to allow my cart to be pulled by an automobile, I provide two hitch brackets 56 spaced apart at the front of my cart. These may be of conventional type adapted to be engaged with mating parts (not shown) on the automobile. The brackets may be removably attached to the frame 11 or may be pivotally mounted so that they may be removed or pivoted to another position if desired while the device is used as a cart.

In use as a golf cart, the rear wheel 15 is fully withdrawn into the cart to its driven position as shown in FIG. 1. In this position, as explained above, the chain 21 is engaged with the driven sprocket 25 on the wheel. The cart may then be operated as any other golf cart. It will be obvious that any conventional clutch system or speed reduction or both may be used in the motor drive system. Such conventional features are not shown since they are common in the art and may be varied according to the desire of the manufacturer of any particular device. The steering is also conventional, and to all casual observation, the cart could be a conventional golf cart. In order to move the cart from one location to another, it would be necessary simply to run the cart adjacent to the rear of an automobile, engage the hitches 56 with the mating parts on the auto, and then crank the rear wheel 15 down to its trailing position by means of the crank 43 operating the system as described. In the trailing position, the rear wheel 15 is free to rotate on its axle 28 and to caster about the axle 30 so that the cart has now become a simple one-wheel trailer. It can now be pulled by the auto to any desired location as easily as any trailer.

Upon arrival at the new location, the hitches 56 may be disconnected, the wheel 15 cranked to its driven position with the alignment means operating as described to assure proper driving, and the device then again becomes a self powered golf cart available for use as such. Thus I have provided a self powered golf cart which is easily transportable by automobile to any desired location.

Having thus described my invention in its embodiment, I am aware that further and extensive variations may be made therefrom without departing from the spirit and scope of my invention as limited only by the following claims.

I claim:

1. A self propelled cart comprising a frame, movable front wheels mounted on said frame, steering means connected to said wheels whereby said wheels may be steered to change direction of said cart, drive means mounted on said frame, a single rear wheel in normal driven engagement with said drive means, mounting means carrying said rear wheel, said mounting means being pivotally connected to said frame whereby said rear wheel may be moved to a lowered position out of engagement with said drive means, said mounting means including bearing means and arm means journalled in said bearing means, said rear wheel being rotatively journalled on said arm means, said arm means and bearing means being arranged so that said rear wheel becomes a caster in said lowered position.

2. The device of claim 1 in which nut means is fixed to said mounting means and threaded crank means rotatably mounted on said frame means engaged with said nut means to control the movement of said mounting means from one position to another.

3. The device of claim 1 in which alignment means are mounted on the frame, said alignment means being engageable with said mounting means as said mounting means moves from the lowered position to the drive engagement position.

4. A self propelled cart comprising a frame, movable front wheels mounted on said frame, steering means connected to said wheels whereby said wheels may be steered to change direction of said cart, drive means mounted on said frame, a single rear wheel in normal driven engagement with said drive means, mounting means carrying said rear wheel, said mounting means being pivotally fixed to said frame whereby said rear wheel may be moved to a lowered position out of engagement with said drive means, said mounting means including bearing means and arm means journalled in said bearing means, said rear wheel being rotatively journalled on said arm means, said arm means and bearing means being arranged so that said rear wheel becomes a caster in said lower position, and hitch means on said frame whereby said frame may be hitched to an automobile for pulling thereby.

5. A self propelled cart comprising a frame, front wheels movably mounted on said cart, steering means connected to said wheels whereby said wheels may be moved to steer said cart, drive means mounted on said frame, bar means pivotally mounted on said frame adapted to be moved between two positions, tilting mechanism mounted on said frame and engaged with said bar means whereby the position of said bar means may be controlled, arm means pivotally mounted on said bar means, a rear wheel rotatably journalled on said arm means, said wheel including means adapted to be driven by engagement with said drive means, said two positions of said bar means being such as to define an upper position of said rear wheel and a lower position, said rear wheel being in driven engagement with said drive means when in said upper position and free of driven engagement when in said lower position, alignment means on said frame and said rear arm means, engageable in said upper position to cause said rear wheel to be aligned in proper position to engage said drive means, and hitch means on said frame whereby said cart may be towed.

6. The device of claim 5 in which said alignment means comprises an alignment bar on said arm means, carrier arm means pivotally mounted on said frame, beam means carried by said carrier arm means adapted to engage said alignment bar in sliding engagement and spring means pressing said beam toward said alignment bar to cause said beam and alignment bar to become properly aligned.

7. A self propelled cart comprising a frame, front wheels movably mounted on said frame, steering means connected to said wheels whereby said wheels may be moved to steer said car, drive means mounted on said frame, bar means pivotally mounted on said frame to be moved between two positions, arm means pivotally mounted on said bar means, a rear wheel rotatably journalled on said arm means, said arm means being positioned such that said rear wheel may become a castered wheel in one of said two positions of said bar means, said wheel including means adapted to be driven by engagement with said drive means, said two positions of said bar means being such as to define an upper position and a lower position of said wheel, said wheel being in driven engagement with said drive means in said upper position and free of driven engagement in said lower position, and hitch means on said frame whereby said cart may be towed when said wheel is in the lower position.

References Cited by the Examiner
UNITED STATES PATENTS

| | | | |
|---|---|---|---|
| 1,434,006 | 10/22 | Guthrie | 180—74 |
| 2,203,022 | 6/40 | Kamplade | 280—43.2 |
| 2,339,582 | 1/44 | Peterson | 280—62 |
| 2,574,199 | 11/51 | Tandler et al. | 180—25 |
| 2,582,177 | 1/52 | Swisher et al. | 180—19 |
| 2,731,096 | 1/56 | Thelander | 180—13 X |
| 2,876,854 | 3/59 | Tetyak | 180—19 |
| 3,108,482 | 10/63 | Polzin | 74—228 |

FOREIGN PATENTS

| | | |
|---|---|---|
| 176,514 | 3/22 | Great Britain. |

A. HARRY LEVY, *Primary Examiner.*

KENNETH H. BETTS, *Examiner.*